Sept. 10, 1935.    R. GARGIULO    2,014,251
FLAPPING WING FOR AIRPLANES, GLIDERS AND THE LIKE
Filed Dec. 19, 1934
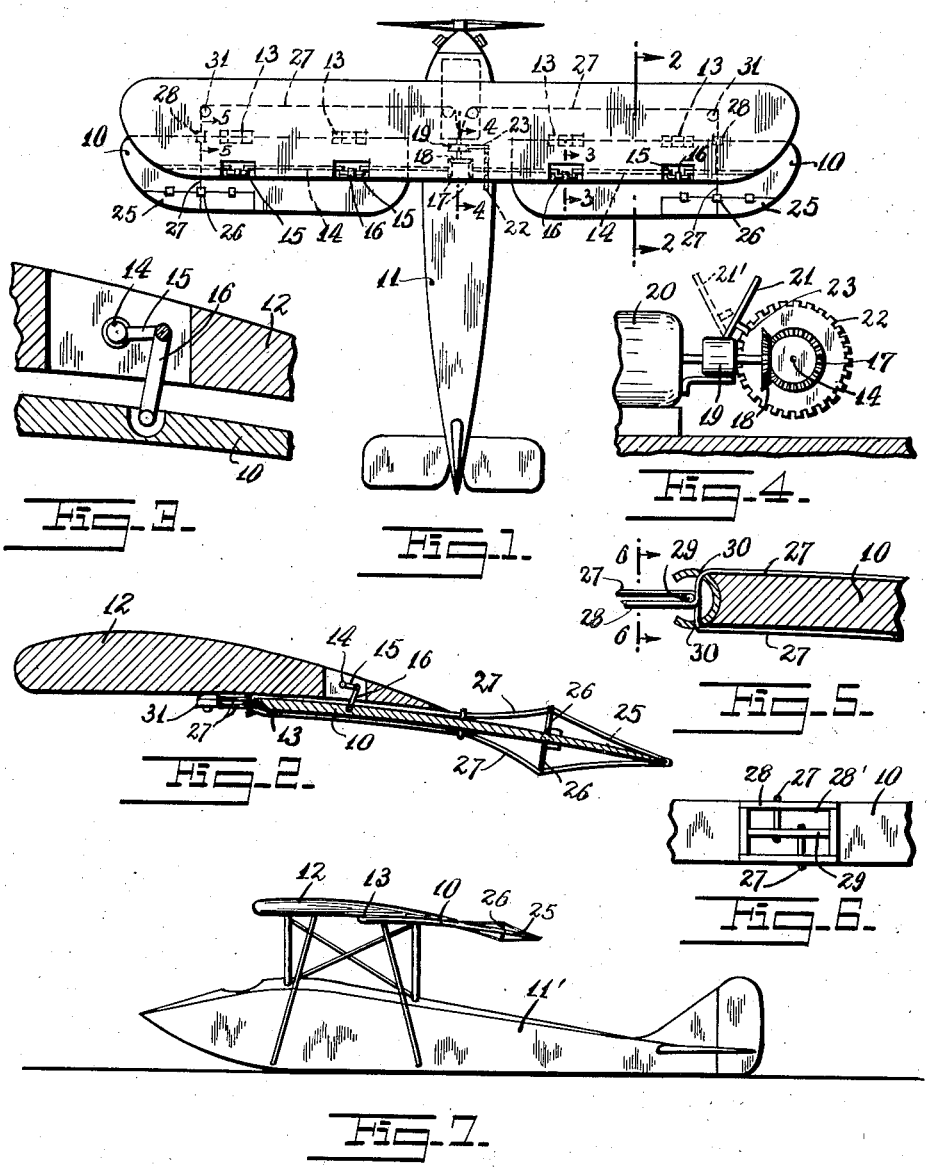
INVENTOR
RICHARD GARGIULO
BY
ATTORNEY Patented Sept. 10, 1935

2,014,251

UNITED STATES PATENT OFFICE 2,014,251

FLAPPING WING FOR AIRPLANES, GLIDERS, AND THE LIKE

Richard Gargiulo, New York, N. Y.

Application December 19, 1934, Serial No. 758,209

7 Claims. (Cl. 244—11)

This invention relates to new and useful improvements in a flapping wing for airplanes, gliders, and the like.

The invention has for an object the construction of a flapping wing which is characterized by a main stationary wing of the airplane extending transversely across the fuselage, and flap wings on each side of the fuselage and located beneath the main wing and projecting from the rear edge thereof, and associated with mechanism to cause flapping thereof.

Still further, the invention contemplates arranging the flap wings hingedly connected at their front edges upon the bottom face of the main wings.

Furthermore, the invention also contemplates the provision of transverse crank shafts mounted on the main wing and associated with links connected intermediate the ends of the flap wings to cause flapping thereof upon rotation of the shafts.

A still further object of the invention is the provision of a mechanism for holding the flap wings in various fixed positions if so desired.

Still further the invention contemplates the provision of ailerons upon the ends of the flap wings, and mechanism for controlling the operations thereof.

Another object of the invention is the construction of a device as mentioned which is simple and durable, and which may be manufactured and sold at a reasonable cost.

For further comprehension of the invention and of the objects and advantages thereof, reference will be had to the following description and accompanying drawing, and to the appended claims in which the various novel features are more particularly set forth.

In the accompanying drawing forming a material part of this disclosure:—

Fig. 1 is a plan view of an airplane equipped with flap wings according to my invention.

Fig. 2 is an enlarged sectional view taken on the line 2—2 of Fig. 1.

Fig. 3 is a fragmentary sectional view taken on the line 3—3 of Fig. 1.

Fig. 4 is a fragmentary sectional view taken on the line 4—4 of Fig. 1.

Fig. 5 is a fragmentary sectional view taken on the line 5—5 of Fig. 1.

Fig. 6 is a fragmentary elevational view looking in the direction of the line 6—6 of Fig. 5.

Fig. 7 is a side elevational view of a glider equipped with flap wings according to my invention.

The flapping wings for airplanes, gliders and the like, comprise a pair of flap wings 10 arranged on each side of an airplane fuselage 11 of an airplane having a main stationary wing 12 transversely arranged across the fuselage. The flap wings are so located that their rear edges project past the rear edges of the main wing. The flap wings 10 are hingedly connected with hinges 13 on their front edges upon the bottom face of the main wing.

A mechanism is provided for flapping the flap wings. This mechanism comprises transverse shafts 14 rotatively mounted in the main wing and equipped with crank portions 15. These crank portions connect with links 16 pivotally connected intermediate the ends of the flap wings. The inner ends of the shafts 14 are equipped with bevel gears 17 meshing with a bevel gear 18 on a shaft connected with a clutch 19 by which the shaft may be connected with the shaft of a prime mover 20. This prime mover may be an auxiliary motor or the main motor of the airplane.

The clutch 19 is controlled with a handle 21. With the handle 21 in the full line position shown in Fig. 4, the clutch is open and inoperative so that no rotations are transmitted from the motor. But, with the clutch handle in the dot and dash line position, indicated by numeral 21', the clutch is operative and transmitting. A toothed wheel 22 is fixed upon one of the shafts 14 and may be held in stationary positions by a pawl 23 mounted upon the handle 21. The pawl 23 engages the toothed wheel only when the clutch is inoperative. When the clutch is moved to the operative position, it is automatically moved out of contact. The clutch and toothed wheel 22 comprise a means for latching the flap wings into desired stationary positions.

Ailerons 25 are mounted upon the ends of the flap wings. These ailerons are hingedly mounted at their front ends upon the bodies of the flap wings. Radial rods 26 project upwards and downwards from the ailerons. Aileron control wires 27 connect with the rods 26 and extend along the top and bottom sides of the flap wings to the pivotal areas. At the pivotal areas the flap wings are provided with bushings 28 comprising a cylindrical wall with an open front side 28' and housing an axial bar 29. The wires 27 and 28 pass through apertures 30 in the sides of the bushings 28 into the bushings and then extend around axial bars 29, and then extend outwards (see Fig. 5) from the openings 28'. The arrangement is such that the flap wings may flap without affecting the aileron adjustment. Control wires 27 continue and extend over guiding pulleys 31 upon the main wing 12 to the control chamber (not illustrated on the drawing) of the airplane. Details of operating the ailerons will not be given in this specification since in all respects they are identical to well-known forms.

The operation of the device is as follows:—
Assume the airplane on the ground ready for flight. The aviator may take off in the conventional manner and be assisted in the take-off by the flapping wings. If desired, the flapping wings may be brought into action only during the flight of the plane. The flapping wings may be held in stationary positions whenever desired. An advantageous time would be when it is desired to land the airplane, in that then the head resistance may be increased to decrease the flying speed.

A feature of the invention is that the flapping of the wings will assist in attaining altitude, since on each downward motion of the wings there will be a tendency to lift the plane. On the upward motion, the air caught between the main wing and the flapping wings will be expelled, and thus assist forward flight. The feature of having the flapping wings extending rearwards from the main wings resides in the fact that then the ailerons may be arranged upon the flapping wings. It is desired that the ailerons be arranged as far to the rear as is possible for stability in flight and operation of the machine. A further purpose of having the flapping wings extending rearwards of the main wing is to offset control or balance some of the upward forces produced by the flapping wings when they move downwards. The ailerons can be adjusted to supplement the functioning of the flapping wings in increasing or decreasing the upward or downward flapping areas.

The flapping wings may be held stationarily in desired positions by proper control of the handle 21. This handle may be moved to engage or disengage the clutch, and in all disengaged positions of the clutch, the pawl 23 will engage the toothed wheel 22 to hold the flapping wings stationary.

In Fig. 7 a glider 11' is illustrated with flap wings 10 according to this invention and corresponding parts may be recognized by corresponding reference numerals.

While I have illustrated and described the preferred embodiment of my invention it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. In an airplane, a main stationary wing extending transversely across the fuselage, a flap wing on each side of the fuselage and located beneath the main wing and projecting from the rear edge thereof, said flap wings being hingedly connected at their front edges upon the bottom face of the main wing, ailerons on said flap wings, means for controlling said ailerons, and means for flapping said flap wings.

2. In an airplane, a main stationary wing extending transversely across the fuselage, a flap wing on each side of the fuselage and located beneath the main wing and projecting from the rear edge thereof, said flap wings being hingedly connected at their front edges upon the bottom face of the main wing, and means for flapping said flap wings, comprising transverse shafts arranged in the main wing and equipped with crank portions, and links connecting said crank portions with said flap wings, and means for rotating said shafts in unison, comprising bevel gears upon the inner ends of the shafts meshing with a master bevel gear, and a prime mover connected to operate the master bevel gear under control, comprising a clutch for controlling the transmission of power, said clutch including a handle adapted to assume one position for the operative position of the clutch, and a second position for the inoperative position, a pawl mounted upon said handle and engageable with the teeth of a toothed wheel fixed on one of said shafts, when the clutch handle is in the inoperative position.

3. In an airplane, a main stationary wing extending transversely across the fuselage, a flap wing on each side of the fuselage and located beneath the main wing and projecting from the rear edge thereof, said flap wings being hingedly connected at their front edges upon the bottom face of the main wing, means for flapping said flap wings, means for latching said flap wings in any fixed position, ailerons on said flap wings, and means for operating said ailerons.

4. In an airplane, a main stationary wing extending transversely across the fuselage, a flap wing on each side of the fuselage and located beneath the main wing and projecting from the rear edge thereof, said flap wings being hingedly connected at their front edges upon the bottom face of the main wing, means for flapping said flap wings, ailerons mounted upon the ends of said flap wings, and means for controlling said ailerons.

5. In an airplane, a main stationary wing extending transversely across the fuselage, a flap wing on each side of the fuselage and located beneath the main wing and projecting from the rear edge thereof, said flap wings being hingedly connected at their front edges upon the bottom face of the main wing, means for flapping said flap wings, ailerons mounted upon the ends of said flap wings, and means for controlling said ailerons, comprising radial rods projecting from the hinged points of the ailerons, and control wires connected with said rods and extending along the top and bottom faces of the flap wings to the pivoted areas, and at the pivot areas extending across the rods axially therewith.

6. In an airplane, a main stationary wing extending transversely across the fuselage, a flap wing on each side of the fuselage and located beneath the main wing and projecting from the rear edge thereof, said flap wings being hingedly connected at their front edges upon the bottom face of the main wing, means for flapping said flap wings, ailerons mounted upon the ends of said flap wings and means for controlling said ailerons, comprising radial rods projecting from the hinged points of the ailerons, and control wires connected with said rods and extending along the top and bottom faces of the flap wings to the pivoted areas, and at the pivot areas extending across rods axially therewith, said rods being mounted within brackets mounted upon the front edges of the flap wings.

7. In an airplane, a main stationary wing extending transversely across the fuselage, a flap wing on each side of the fuselage and located beneath the main wing and projecting from the rear edge thereof, said flap wings being hingedly connected at their front edges upon the bottom face of the main wing, and means for flapping said flap wings, ailerons mounted upon the ends of said flap wings, and means for controlling said ailerons, comprising radial rods projecting from the hinged points of the ailerons, and control wires connected with said rods and extending along the top and bottom faces of the flap wings to the pivoted areas, and at the pivot areas extending across rods axially therewith, said rods being mounted within brackets mounted upon the front edges of the flap wings, said brackets having openings through which the wires may pass.

RICHARD GARGIULO.